United States Patent [19]

Nichols et al.

[11] Patent Number: 4,963,219
[45] Date of Patent: Oct. 16, 1990

[54] METHOD OF MAKING AND ASSEMBLING ROOF EDGE STRUCTURES INCORPORATED WITH SINGLE-PLY POLYMER-COATED FABRIC ROOF STRUCTURES

[75] Inventors: Wayne G. Nichols, Bay City; John C. Greko, Saginaw; Francis R. Laurion, Vassar, all of Mich.

[73] Assignee: Duro-Last Roofing, Inc., Saginaw, Mich.

[21] Appl. No.: 340,138

[22] Filed: Apr. 17, 1989

Related U.S. Application Data

[62] Division of Ser. No. 197,580, May 5, 1988, Pat. No. 4,848,045.

[51] Int. Cl.$^5$ .............................................. B29C 65/00
[52] U.S. Cl. ............................... 156/304.2; 156/304.6; 156/322; 156/502
[58] Field of Search ............... 156/304.6, 304.1, 304.2, 156/509, 502, 322

[56] References Cited

U.S. PATENT DOCUMENTS 3,897,296  7/1975  Waldrum .................... 156/258 X
4,223,487  9/1980  St. Clair ..................... 52/11
4,752,350  6/1988  Schuster .................. 156/304.6 X

FOREIGN PATENT DOCUMENTS 603078  8/1960  Canada ........................... 52/58

Primary Examiner—Michael W. Ball
Assistant Examiner—Mark A. Osele
Attorney, Agent, or Firm—Learman & McCulloch

[57] ABSTRACT

A single-ply, thermoplastic membrane roof construction includes, at its corners, a pair of right angularly disposed substantially rigid, edge corner pieces welded together along a mitered joint by way of bringing a heating block into contact with the horizontal and vertical edges to be joined, and then converging the pieces to form the mitered corner which is fastened to the underlying roof structure. Strips formed of the same membrane fabric material as the roof covering membrane are welded to the horizontal upper walls of the edge pieces. Edge linear continuation strips are fastened in position to extend from the corner pieces, but with a gap between them and the corner-forming pieces. Clips mated to the configuration of the edge pieces and strips have portions at one of their upper and lower ends which snap into position to unite the spaced apart edge pieces.

2 Claims, 3 Drawing Sheets

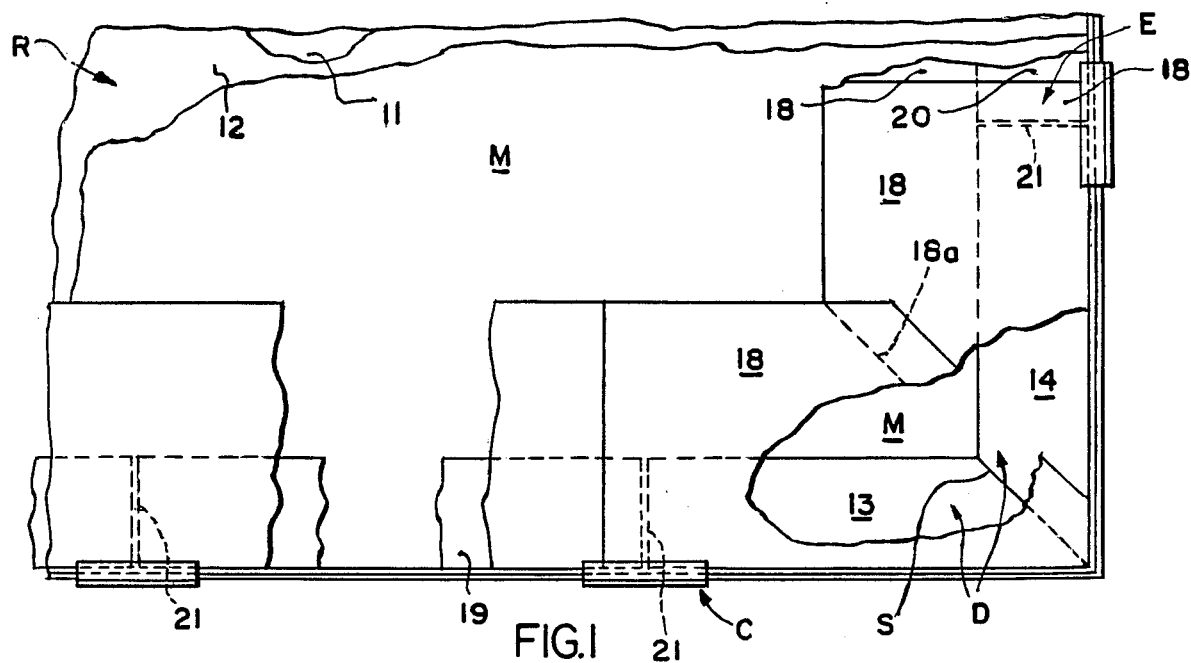
FIG. 1
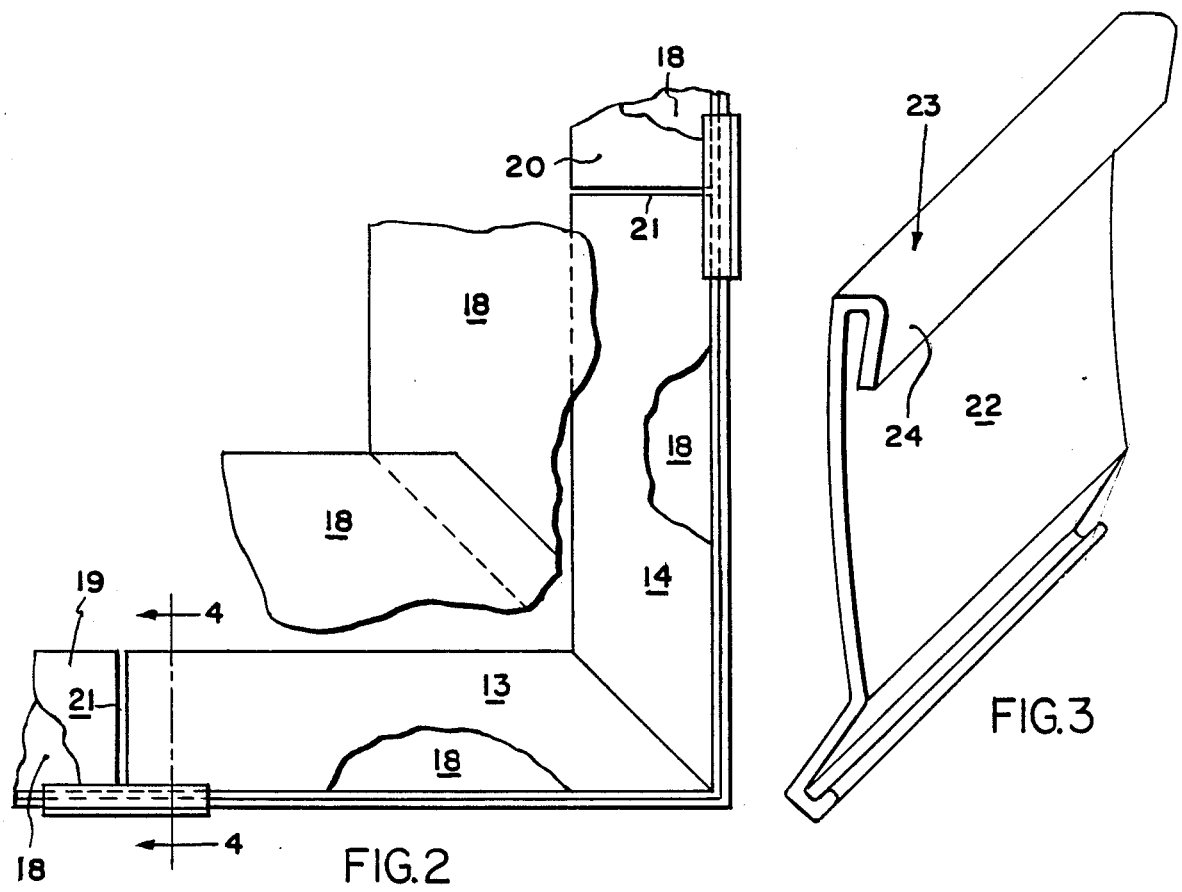
FIG. 2
FIG. 3

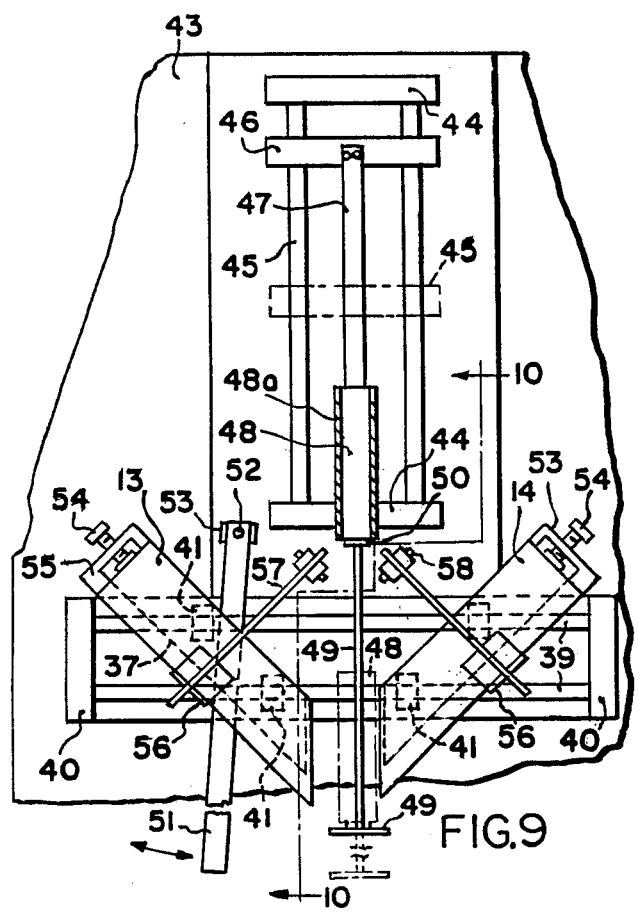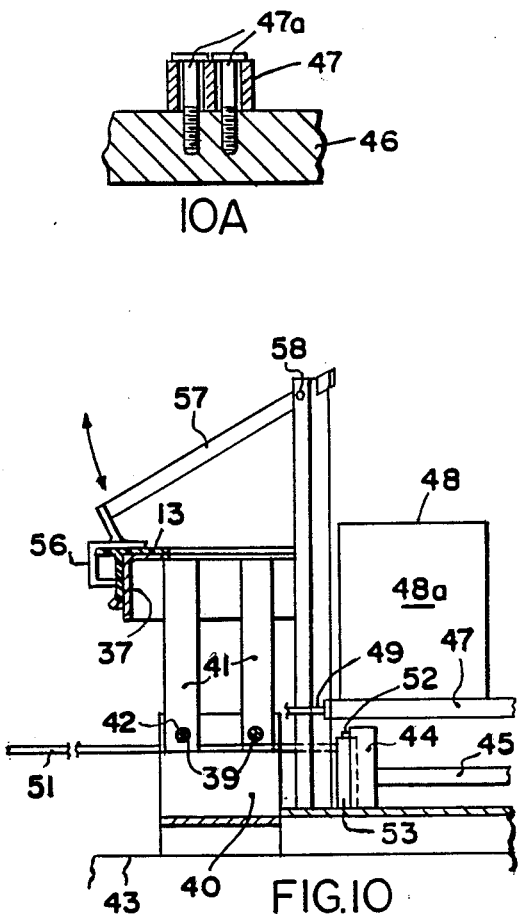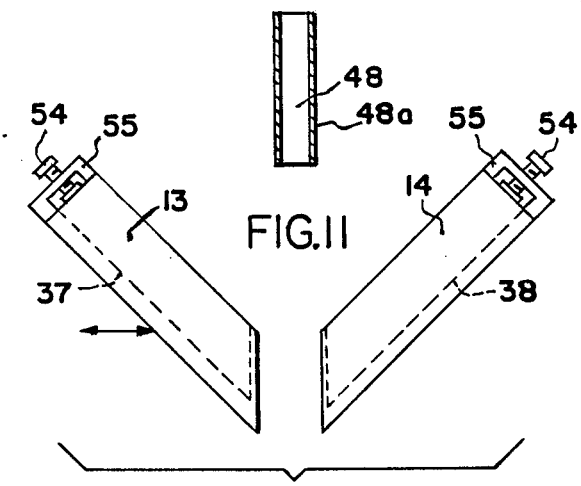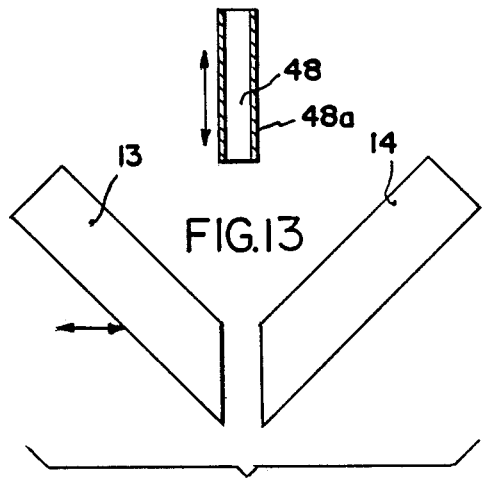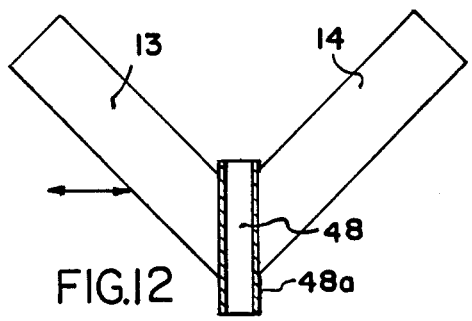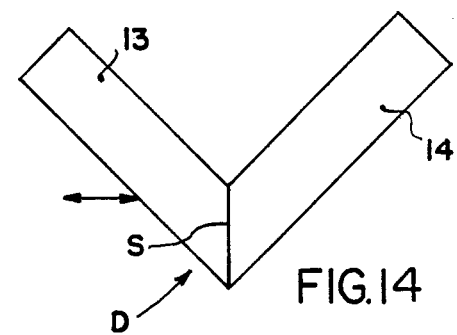

METHOD OF MAKING AND ASSEMBLING ROOF EDGE STRUCTURES INCORPORATED WITH SINGLE-PLY POLYMER-COATED FABRIC ROOF STRUCTURES

This is a divisional of co-pending application Ser. No. 197,580, filed on May 5, 1988, now U.S. Pat. No. 4,848,045.

BACKGROUND OF THE INVENTION

The present invention is concerned with roof edge constructions for roofs incorporating one piece, single-ply roof covering membranes.

BACKGROUND OF THE INVENTION

Unitary, flexible plastic membranes which fit the contour of "minimum pitched" roofs are achieving ever-wider commercial acceptance today, and particularly polymer-coated fabric core membranes which are factory-fabricated on a custom basis to fit premeasured roofs, and then are shipped to the site in strip rolls which are heat-welded together at the site to form unitary leakproof membranes. Such membranes are frequently used in new construction over insulation material. They are also installed over existing roofing on flat, industrial roofs, for example, to provide a roof covering which is reliably sealed, and does not become stiff, inflexible, or cracked when subjected to weathering, ultra violet rays, abrasions, and microorganism attack. It has been conventional to form edge members which are sealed at their longitudinally abutting edges by caulking or mastic applied to the joints at the job site, but problems have been encountered because the members expand and contract with temperature changes and tend to pull away from the caulking.

SUMMARY OF THE INVENTION

The present invention is concerned with the formation and installation of substantially rigid, edge structures which are normally provided around the perimeter of such roofs. Like the welded flexible strip sections of the unitary membrane, these structures must be sealed in a reliable and leak-proof manner, and further must be sealed to the single-ply membrane in a reliable and leak-proof manner to prevent the entrance of moisture between the edge structure and membrane. The invention contemplates the provision of substantially rigid snap-on clip plates to bridge the gaps which are left between the adjacent edges of the non-collapsible edge sections to permit thermal expansion thereof. The clip plates, which, at the site, snap to a position over the membrane strips welded to the edge sections at the factory, are configured to mate with the contoured edge sections and retain the same basic appearance.

One of the prime objects of the present invention is to provide an improved method of forming reliably sealed edge constructions while presenting a very attractive appearance.

A further object of the invention is to provide an edge enclosing structure which is sufficiently strong and durable in nature that it will not fail when subjected to wind up-lift forces tending to raise the membrane.

Still another object of the invention is to provide an economically and simply fabricated edge structure which can be readily installed in place in the field by relatively unskilled workmen.

Still another object of the invention is to provide an edge strip and clip composite construction which snaps easily into assembled relation in the field.

Still another object of the invention is to provide an economical construction in which the edge strips and clips are formed of extruded thermoplastic plastic sections.

The edge structure includes corners, fabricated of a pair of extruded, angular, miter-cut, thermoplastic pieces which each have a generally horizontal top wall integrally joined to a generally vertical side wall, the pieces being butt-welded at their matching, confronting, mitered edges. These pieces are formed by mounting them separately on spaced divergent templates, then disposing a heated block between the side edges of the pieces and converging the side edges into engagement with the sides of the block to melt and plastify the edges. Then the block is removed and the templates are further converged to bring the plastified edges into engagement and weld them together.

The mating clip strips hook over the upper portions of the terminal ends of the corners and the like upper portions of the edge strips which are adjacent to them, and further hook over the laterally outwardly extending lower flanges of the corners and the adjacent edge strips, in a snap-on action providing the utmost ease of installation.

Other objects and advantages of the invention will be pointed out specifically or will become apparent from the following description when it is considered in conjunction with the appended claims and the accompanying drawings.

IN THE DRAWINGS

FIG. 1 is a fragmentary, top plan view illustrating one corner of a single-ply membrane roof, which incorporates the novel edge structure, in place on a roof surface;

FIG. 2 is a slightly enlarged, top plan view of the edge corner structure, with clips shown as attached at the ends for the purpose of joining adjacent edge strips, and the membrane strips broken away;

FIG. 3 is a greatly enlarged, perspective, elevational view of one of the clips;

FIG. 9 is a schematic top plan view of a system for joining and welding the confronting edges of the pieces which form the corner piece;

FIG. 10 is a sectional, elevational view, taken on the line 10—10 of FIG. 9;

FIG. 10A is a fragmentary, sectional elevational view illustrating the manner of mounting the heating block which is employed to heat the confronting edges of the edge corner pieces; and FIGS. 11–14 are schematic top plan views, illustrating various steps in the fabrication process.

GENERAL DESCRIPTION

Figure 4:
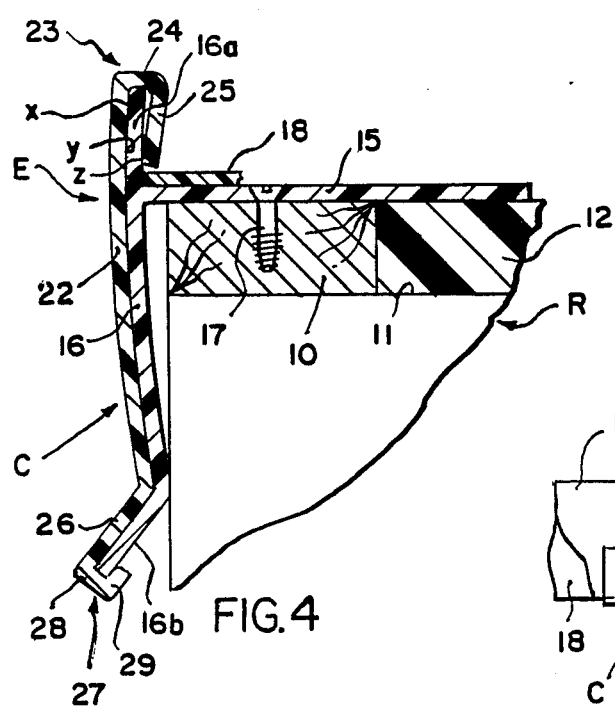
FIG. 4 is a sectional, elevational view, on an enlarged scale, taken on the line 4—4 of FIG. 2.

Referring now more particularly to the accompanying drawings, and in the first instance to FIGS. 1-4, a roof sub-structure, generally designated R, is disclosed as having a nailable, typically wood edge strip 10 around its perimeter, secured on a deck surface 11, and as having abutting insulation 12 which covers the top of the deck surface. As FIG. 1 particularly illustrates, this underlying roof structure is covered by a single-ply plastic membrane, generally designated M, comprising a fabric core having a polymer coating on each of its upper and lower faces, which may be of the character disclosed in the present assignee's U.S. Pat. No. 4,652,321.

What is termed a drip edge, gravel stop or facia is provided around the perimeter of the roof, and this edge structure is generally indicated at E. As FIGS. 1 and 4 particularly discloses, the edge structure E incorporates a corner, generally designated D, made up of a pair of right-angularly disposed linearly extending pieces 13 and 14 which are joined together along a mitered seam S (see FIG. 1). Each of the pieces 13 and 14 includes a top wall 15 integrally joined to a generally vertical contoured wall 16, which has a top edge 16a projecting above the wall 15, and an outwardly and downwardly angled lower flange 16b. The upper wall 15 is securely fastened to the roof structure, as, for instance, by providing screw fasteners 17, which at longitudinally spaced intervals extend down into the edge strip 10.

The upper wall 15 of each of the joined corner pieces 13 and 14, is provided with a membrane cover strip or skirt 18 of the same material as the membrane M, and, as disclosed in FIG. 1, the membrane 18 for the strip 13, laps the membrane 18 for the strip 14 at the corner seam S. The edge members D are typically polyvinylchloride extrusions, to which the membrane strips 18 are heat-welded at the factory. The strips 18, which have a polyvinylchloride composition outer coating on each face, will readily heat-weld to one another along their bias into lapped portions 18a, and further readily heat-weld to the upper surface of the membrane M as shown in FIG. 1.

At the ends of corner pieces 13 and 14, identically contoured edge strips 19 and 20 of the same plastic material are respectively provided in slightly spaced relation to provide gaps 21, i.e. one inch, for the purpose of allowing thermal expansion. The linear members 19 and 20 have upper walls 15 and lower walls 16 which are identical to the similar walls of the pieces 13 and 14, and similarly have membrane strips or skirts 18 welded to their upper walls 15, which are positioned in lapped relation with the membrane strips 18 welded to members 13 and 14. These lapped membrane strips 18 are welded together in the field at the site during the installation process, when the strips 18 of the various members 13, 14, 19, and 20 are heat-welded to the membrane M.

Each of the gaps 21 is closed by a clip strip, generally designated C. The clips C may similarly be formed of an extruded polyvinylchloride plastic material, and the version disclosed in FIGS. 3 and 4 includes a generally vertical wall 22, generally shaped to the configuration of wall 16, which has a hook-shaped upper edge generally designated 23. Edge 23 consists of a horizontal web 24 integrally joining the wall 22 to a downwardly angled flange portion 25, which extends at a slight angle outwardly and downwardly toward the wall 22. Because the upper edge 16a of the edge D is more vertical along its outer surface x, than is the confronting counterpart inner surface y of the upper portion of wall 22, the effect, when the upper hook edge 23 of clip 22 is pushed down on edge 16a, is to effect a wedging action which spreads the resilient flange 25 from its normal position, and causes it to tightly grip the edge 16a at the surface z.

The lower edge of the clip wall 22 is formed with an outwardly extending flange 26, having a hook end, generally designated 27, comprised of joining web 28 and retaining edge 29. Once the hook end 23 is installed in position, the end 27 may be forced inwardly, with the result that the end 29 snaps past and over the flange 16b, the members D and E being sufficiently resilient to permit this to occur.

Figure 8:
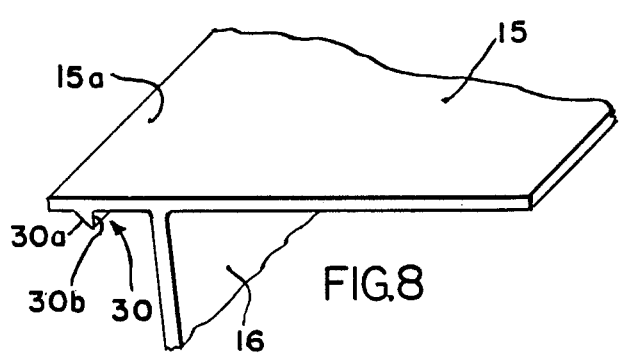
FIG. 8 is a fragmentary, perspective, elevational view of the upper end of the one of the edge strips.

FIGS. 5-8 illustrate an alternate embodiment of edge members D, which, for purposes of convenience, have been identified by the same numerals where the parts are identical. As FIGS. 6 and 8 particularly disclose, the edge D and the various strips 13, 14, 19 and 20, in this form of the invention, differ in that no upper edge for the wall 16 is formed to extend above the top wall 15 and, rather, the wall 15 projects rearwardly of the wall 16 as at 15a. Provided on the lower surface of portion 15a, at a spaced distance inwardly from its outer edge as shown in FIG. 8 particularly, is a dependent bead, generally designated 30, which is provided with an inclined camming edge 30a, and a vertical retaining edge 30b.

Provided on the upper end of the wall 22, of the clip disclosed in FIGS. 5-8, is a horizontal hook portion, generally designated 31, which includes an outwardly extending lower wall 32, internally joined to an upper wall 33 by a web portion 34 of predetermined height. Spaced a predetermined distance inwardly from the web 34, is a bead 35, having an inclined piloting wall 35a and a vertical retaining wall 35b. In the installation of this clip C, the horizontally hooked portion 31 is moved forwardly over the portion 15a of the edge D, and with engagement of the camming surfaces 35a and 30a, is resilient enough to snap under the bead 30 to the position indicated in FIG. 6. The lower hooked end 27 of this form of clip C will be installed in position over the flange 16b first of all. Each of the beads 30 and 35 extend the full length of the various strips 13, 14, 19 and 20, and the full lengths of the clips C, respectively. There are, of course, additional strips 19 and 20 joined to one another by clips C, dependent on the extent of the perimetral structure E to be formed.

THE METHOD OF FORMING THE CORNERS

Figure 5:
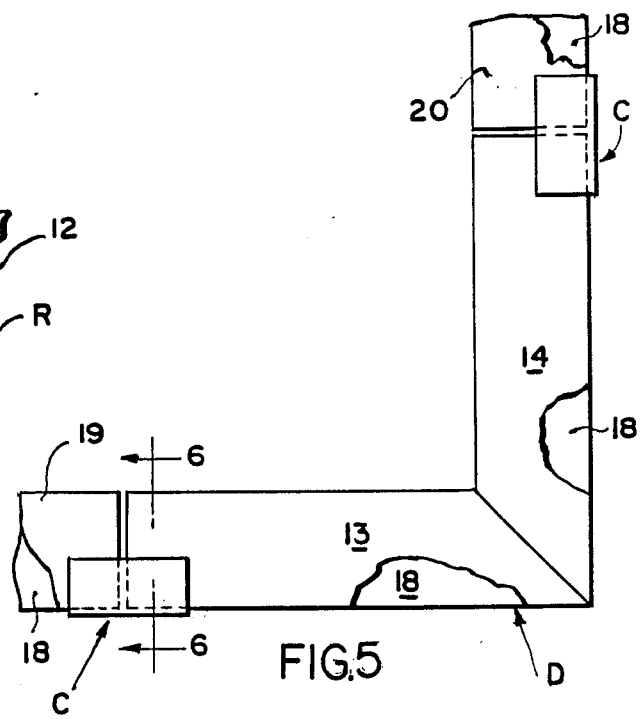
FIG. 5 is a top plan view, similar to FIG. 2, illustrating clips of a modified construction in place at the free ends of the edge corner.
Figure 6:
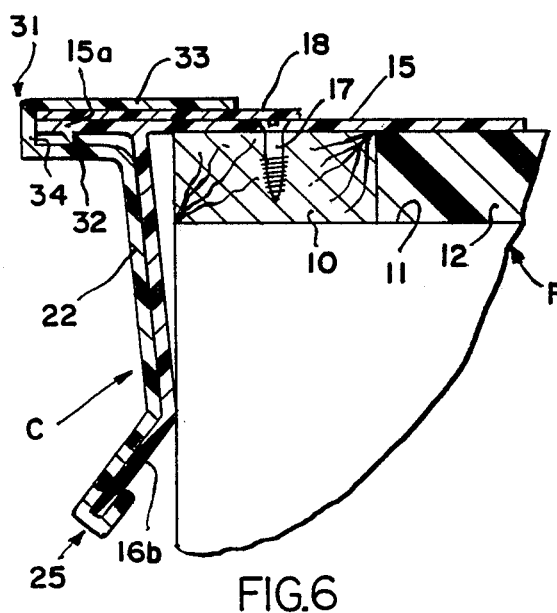
FIG. 6 is an enlarged, sectional, elevational view, taken on the line 6—6 of FIG. 5.
Figure 7:
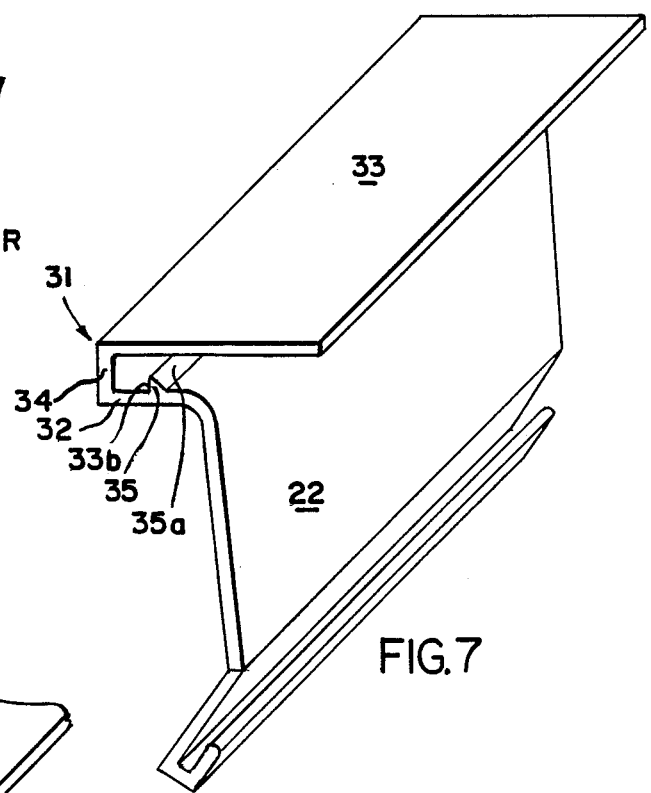
FIG. 7 is a considerably enlarged, perspective, elevational view, illustrating the modified clip construction.

FIGS. 9 and 10 particularly illustrate apparatus which may be used to join the edge corner pieces 13 and 14. In these figures, the formation of corner pieces having a configuration of the character disclosed in FIGS. 5, 6 and 8, is illustrated. FIG. 9 shows a pair of edge pieces 13 and 14, arranged in spaced-apart, convergent relation on a pair of convergent templates 37 and 38.

The template 37 is mounted for travel on a pair of guide rods 39, fixed between a pair of end walls 40 by means of vertical supports 41 having slide openings 42 through which the guide rods 39 extend. The template 38 may similarly be supported from the rods 39 by means of supports 41, which are fixed in position on rods 39. End walls 40 form part of a frame, fixed to a table 43, or the like, which also has fixed end walls 44, mounting a pair of guide rods 45 along which a carriage 46 travels.

Carriage-carried support 47 mounts an aluminum heating block 48 which has embedded block heating wires connected to a suitable source of electrical power. The block 48 further is preferably provided with a removable teflon sheath 48a covering its side walls. Support 47 is connected to carriage 46 by screws 47a received in oversize bores 46a in carriage 46 so that a slight pivot of member 47 is permitted for a purpose which will be described (see FIG. 10A). A handle rod 49 is connected to the lower end of carriage 47 by an insulated coupling 50, and has a handle 49a which can be pulled forwardly to dispose the block 48 between the templates 37 and 38, as indicated by the chain lines in FIG. 9. Lever 51, which is pivotally mounted at 52 on a block 53 fixed to table 43, can be swung to the right in FIG. 9 about pivot 52 to engage one of the straps 41 connected to template 37, and move the template 37 into a more convergent relationship with respect to template 38.

FIGS. 11–14 indicate the method of operating the apparatus disclosed in FIGS. 9 and 10 for effecting the weld. In the "ready" position, as FIG. 11 illustrates, the edge pieces 13 and 14 have been disposed in position on the templates 37 and 38. Stop screws 54, mounted on blocks 55 carried by the templates 37 and 38 engage and maintain the pieces 13 and 14 in position when the pieces 13 and 14 are being welded. Channel-shaped clamp members 56 (FIG. 10), connected to arms 57, which can be swung upwardly about pivots 58, are provided for clamping the edge pieces 13 and 14 in position on the templates 37 and 38.

Then the heated block 48 is moved forwardly to a position of adjacency with edge piece 14, after which handle 51 is moved to the right in FIG. 9 to move the piece 13 to engage the opposite side of heating block 48. The block 48 can pivot slightly laterally to the right under the pressure of piece to permit it to engage the confronting edge of piece 14 as shown in FIG. 12. Typically, the block 48 may be maintained at a temperature (such as 450° F.) sufficient to heat the identical confronting edges of the strips 13 and 14 almost immediately (about 40 seconds) to a plastic condition. The next step, as shown in FIG. 13, is to remove the block 48 back to original position via the handle rod 49. As the block 48 slides rearwardly the most liquid portion of the melt beads formed on each vertically confronting edge of the corner pieces 13 and 14 is wiped away from the exterior vertical sides of the corner pieces toward the vertical interior sides. Thereafter, further rightward movement of the lever 51 will fully converge the thermoplastic strips 13 and 14 with sufficient force to cause the plasticized confronting edges of the walls 15 and 16 to weld securely together along seam S, with the more liquid material on the vertically extending confronting end walls having been wiped toward interior faces of strips 13 and 14, so that the vertically extending bead of excess plastified material forms at the interior of the seam S and is not visible when the corner is installed. The fabric strips 18 can be welded to pieces 13 and 14 prior to the time they are placed on templates 37 and 38, or after the pieces are welded together.

THE OPERATION

With the corner pieces D formed in the manner just described, the first step in installation of the edge E is to fasten the upper edges 15 of the pieces 13 and 14 firmly in position via screws 17. At this point, the adjoining strips 19 and 20 are placed in position, with their membrane strips 18 lapping the strips 18 of the corner pieces 13 and 14, and as indicated, a gap 21 will be left between the pieces 13 and 19, and 14 and 20. The strips 19 and 20 are also secured via screws 17, the faces 15 similarly having been provided with screw openings to facilitate this.

Dependent on the version of edge D which has been utilized, either of the different clips C will be utilized in centered relation with respect to the gaps 21. The manner of snapping these clips C into position has previously been described and will not be repeated. Following this, the membrane strips 18 will be welded together at their lapped joints, and also welded to the membrane M which they overlie. The edge structure D thus reliably seals the roof deck around its perimeter, and provides an attractive appearance.

While the embodiments of the invention have been described in detail, it will be apparent to those skilled in the art that the disclosed embodiments may be modified. Therefore, the foregoing description in all aspects is to be considered exemplary, rather than limiting in any way, and the true scope of the invention is that defined in the following claims.

What is claimed is:

1. A method of forming roof edge, mitered corner sections consisting of a pair of thermoplastic pieces forming a right angle, with each piece having a generally vertical side facia wall integrally joined to a generally horizontal top wall and with each piece having its top wall and facia wall cut away along complementary matching angles at confronting ends to form a mitered corner, the vertical facia walls of the pieces having outboard and inboard surfaces forming the exterior and interior walls of the corner, the method employing support templates extending generally at right angles one to the other in spaced apart relation, with one of the templates being mounted for linear travel toward the other and with a heated block, having flat side walls mounted for reciprocatory travel from a position between said templates to a position removed from the space between them, the heated block also being mounted for slight lateral shifting movement relative to the templates, the steps of:
   a. clamping said pieces to the respective templates with their confronting ends facing one another to leave a space between them, and their facia and top walls in parallel confronting relationship.
   b. then relatively outwardly moving the heated block in a direction generally parallel to said confronting ends to confront and span said confronting ends of the pieces.
   c. moving said one template toward the other template to move the confronting end of the piece clamped to it into engagement with the block;
   d. continuing to move said one template to shift the block laterally into engagement also with the confronting end of the piece clamped to the other template to melt and plastify the confronting edges of each piece;
   e. moving the block relatively to the templates in an inward direction to wipe the vertical facia walls of the confronting ends of the pieces in a direction from the exterior surface to the interior surface to wipe any liquid material away from the exterior vertical facia wall surfaces of the pieces to the interior wall surfaces.
   f. converging said templates to bring the plastified edges into engagement and force the confronting edges together for a sufficient time to weld them along a seam; and g. unclamping said pieces from the templates.

2. The invention defined in claim 1 wherein thermoplastic plastic coated fabric membrane strips are heat welded to each of the top walls of the pieces, the strips lapping one another above the welded edges.

* * * * *